US012750700B2

(12) United States Patent
Zhan

(10) Patent No.: US 12,750,700 B2
(45) Date of Patent: Sep. 29, 2026

(54) INTER-CELL INTERFERENCE COORDINATION METHOD AND DEVICE, AND STORAGE MEDIUM

(71) Applicant: ZTE CORPORATION, Shenzhen (CN)

(72) Inventor: Yong Zhan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 201 days.

(21) Appl. No.: 18/835,743

(22) PCT Filed: Jan. 13, 2023

(86) PCT No.: PCT/CN2023/072162
§ 371 (c)(1),
(2) Date: Aug. 5, 2024

(87) PCT Pub. No.: WO2023/241041
PCT Pub. Date: Dec. 21, 2023

(65) Prior Publication Data

US 2025/0142361 A1 May 1, 2025

(30) Foreign Application Priority Data

Jun. 15, 2022 (CN) ......................... 202210675300.4

(51) Int. Cl.
*H04W 4/40* (2018.01)
*H04W 16/22* (2009.01)
*H04W 24/02* (2009.01)

(52) U.S. Cl.
CPC ........... *H04W 24/02* (2013.01); *H04W 16/22* (2013.01)

(58) Field of Classification Search
CPC ..... H04W 24/02; H04W 16/22; H04W 16/10; H04W 16/14; H04W 36/22; H04W 16/04;
(Continued)

(56) References Cited

U.S. PATENT DOCUMENTS

2016/0056907 A1 2/2016 Wei et al.
2016/0277172 A1* 9/2016 Yu ......................... H04L 5/0055
(Continued)

FOREIGN PATENT DOCUMENTS

CA 3231095 A1 * 3/2023 .............. G01W 1/06
CN 104105173 A 10/2014
(Continued)

OTHER PUBLICATIONS (ISA/237) Written Opinion of the International Searching Authority dated Jun. 2, 2023.
(Continued)

*Primary Examiner* — Tanmay K Shah
(74) *Attorney, Agent, or Firm* — NZ Carr Law Office

(57) ABSTRACT

This disclosure provides an inter-cell interference coordination method, apparatus, device, and storage medium, the method comprises: predicting a target service load of a target cell in the next period, obtaining a prediction strategy of neighboring cells for a high-coherence neighboring cell in the next period, and determining a cluster state of the target cell based on the prediction strategy of targets and the prediction strategy of neighboring cells; obtaining a prediction strategy of clusters for the cluster where the target cell is located in the next period, and determining that the strategy to be performed by the target cell in the next period is the prediction strategy of targets or the prediction strategy of clusters based on the cluster state.

20 Claims, 4 Drawing Sheets

(58) Field of Classification Search
CPC .. H04W 28/02; H04W 28/0236; H04W 40/16
USPC .......................................................... 455/422.1
See application file for complete search history.

(56) References Cited

U.S. PATENT DOCUMENTS

| | | | | |
|---|---|---|---|---|
| 2020/0100208 | A1* | 3/2020 | Vaidya | H04W 68/02 |
| 2023/0299899 | A1 | 9/2023 | Chen et al. | |
| 2024/0172016 | A1* | 5/2024 | Vikram | H04W 24/02 |

FOREIGN PATENT DOCUMENTS

| | | | | |
|---|---|---|---|---|
| CN | 105611545 | A | 5/2016 | |
| CN | 110602008 | A | 12/2019 | |
| CN | 112954707 | A | 6/2021 | |
| CN | 114189308 | A | 3/2022 | |
| EP | 4408054 | A1 | 7/2024 | |
| WO | 2008119216 | A1 | 10/2008 | |
| WO | 2008155732 | A2 | 12/2008 | |
| WO | WO-2014014792 | A1 * | 1/2014 | H02J 13/1337 |
| WO | 2021244561 | A1 | 12/2021 | |

OTHER PUBLICATIONS

The international search report of the corresponding PCT Application No. PCT/CN2023/072162 mailed on Jun. 2, 2023 along with English translation thereof.
EESR of the corresponding EP Patent Application No. 23822613.8 dated Apr. 24, 2026.

* cited by examiner

INTER-CELL INTERFERENCE COORDINATION METHOD AND DEVICE, AND STORAGE MEDIUM

CROSS REFERENCE TO RELATED APPLICATION

The present application is proposed based on International Application No. PCT/CN2023/072162, filed on Jan. 13, 2023, which claims priority to Chinese patent application CN202210675300.4 filed on Jun. 15, 2022 and entitled "Inter-cell interference coordination method and device, and storage medium". The disclosures of the aforementioned applications are hereby incorporated by reference in their entireties.

TECHNICAL FIELD

This disclosure relates to the technical field of mobile wireless networks, and in particular to an inter-cell interference coordination method, device and computer-readable storage medium.

BACKGROUND

How to efficiently use spectrum resources has become a research focus in the field of mobile wireless networks, and a series of novel technologies are constantly emerging. Among them, DSS (Dynamic Spectrum Sharing) orchestration is one of the representatives.

DSS orchestration refers to a DSS state in which a cell supports simultaneous deployment of wireless access network services of a plurality of standards on a single spectrum (such as 3G/4G/5G DSS), and a state in which service of only one single standard is provided (such as pure 5G), whereas the real-time state of the cell is dynamically adjusted with changes of real-time proportion of loads of users of each standard. DSS orchestration can be used to on one hand dynamically adapt to the trend of changes of services of different standards, and on the other hand significantly improve the efficiency of spectrum resource usage by eliminating fixed overhead of DSS rate matching.

SUMMARY

A primary object of this disclosure is to provide an inter-cell interference coordination method, apparatus, device and computer-readable storage medium.

In a first aspect, this disclosure provides an inter-cell interference coordination method, the method comprises: predicting a target service load of a target cell in the next period according to a historical service load of the target cell in a preset period, and determining a prediction strategy of targets for the target cell in the next period based on the target service load; when there is a high-coherence neighboring cell, obtaining a prediction strategy of neighboring cells for the high-coherence neighboring cell in the next period, and determining a cluster state of the target cell based on the prediction strategy of targets and the prediction strategy of neighboring cells, wherein the high-coherence neighboring cell is a cell that is adjacent to the target cell and has an overlapping area with the target cell; and obtaining a prediction strategy of clusters for the cluster where the target cell is located in the next period, and determining that the strategy to be performed by the target cell in the next period is the prediction strategy of targets or the prediction strategy of clusters based on the cluster state.

In a second aspect, this disclosure further provides an inter-cell interference coordination device, the inter-cell interference coordination device comprises a processor, a memory, and an inter-cell interference coordination program that is stored in the memory and is executable by the processor, and the inter-cell interference coordination program, when executed by the processor, implements the above-mentioned inter-cell interference coordination method.

In a third aspect, this disclosure further provides a computer-readable storage medium, the computer-readable storage medium stores an inter-cell interference coordination program thereon, wherein the inter-cell interference coordination program, when executed by a processor, implements the above-mentioned inter-cell interference coordination method.

The realization of the purpose, functional features and advantages of this disclosure will be further illustrated with reference to the accompanying drawings in conjunction with embodiments.

DETAILED DESCRIPTION

It should be understood that the specific embodiments described here are merely used to illustrate this disclosure and not intended to be limiting.

Since there may be significant difference in the proportion of services of different standards among different cells, it is highly possible that the cell states among neighboring cells cannot be aligned after DSS orchestration is enabled. If co-frequency neighboring cells are in a 4G/5G DSS state while this cell is in a pure 5G state, then the CRS (Cell Reference Signal) of co-frequency neighboring DSS 4G will cause severe interference to the PDSCH (Physical Downlink Shared Channel) of this cell. When the proportion of services of each cell is different, it is not possible to select an appropriate interference coordination strategy, which results in signal difference among cells. Therefore, how to solve the signal difference among centralized cells has become an urgent technical problem that needs to be solved.

The inter-cell interference coordination method involved in embodiments of this disclosure is mainly applied to an inter-cell interference coordination device, the inter-cell interference coordination device can be a PC, a portable computer, a mobile terminal, or other devices with display and processing functions.

Figure 1:
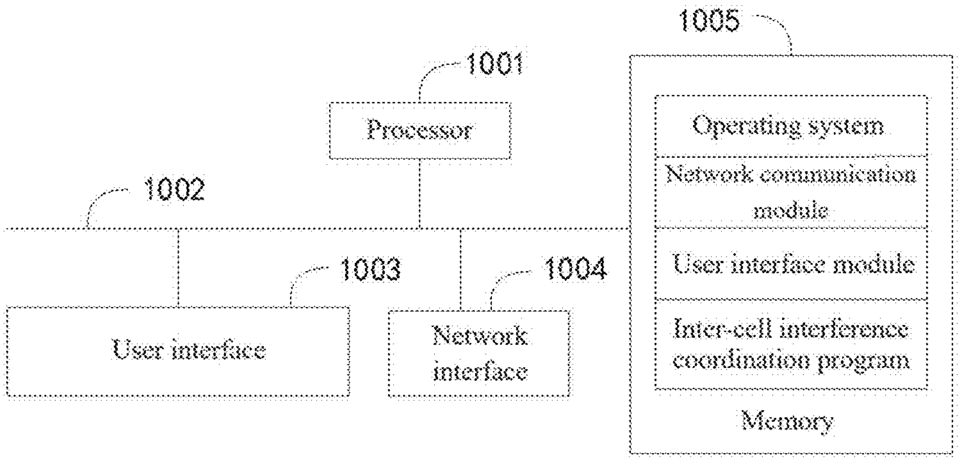
FIG. 1 is a schematic diagram of the hardware structure of an inter-cell interference coordination device involved in an embodiment of this disclosure.

Referring to FIG. 1, FIG. 1 is a schematic diagram of the hardware structure of an inter-cell interference coordination device involved in an embodiment of this disclosure. In an embodiment of this disclosure, the inter-cell interference coordination device can comprise a processor 1001 (for example a CPU), a communication bus 1002, a user interface 1003, a network interface 1004, and a memory 1005. The communication bus 1002 is used to enable connection and communication among these components; the user interface 1003 can comprise a display, and an input unit such as a keyboard; the network interface 1004 can optionally comprise a standard wired interface, a wireless interface (such as a WI-FI interface); the memory 1005 can be a high-speed RAM memory or a stable memory (non-volatile memory), for example a disk memory, the memory 1005 can optionally be a storage device independent of the aforementioned processor 1001.

Those skilled in the art can understand that the hardware structure shown in FIG. 1 does not constitute a limitation on the inter-cell interference coordination device, and the inter-cell interference coordination device can comprise more or less components than those illustrated, a combination of certain components, or a different arrangement of components.

Continuing to refer to FIG. 1, the memory 1005 in FIG. 1 as a computer-readable storage medium can comprise an operating system, a network communication module, and an inter-cell interference coordination program.

In FIG. 1, the network communication module is primarily connected to the server and performs data communication with the server; and the processor 1001 can call the inter-cell interference coordination program that is stored in the memory 1005 and perform the inter-cell interference coordination method provided in an embodiment of this disclosure.

An embodiment of this disclosure provides an inter-cell interference coordination method.

Figure 2:
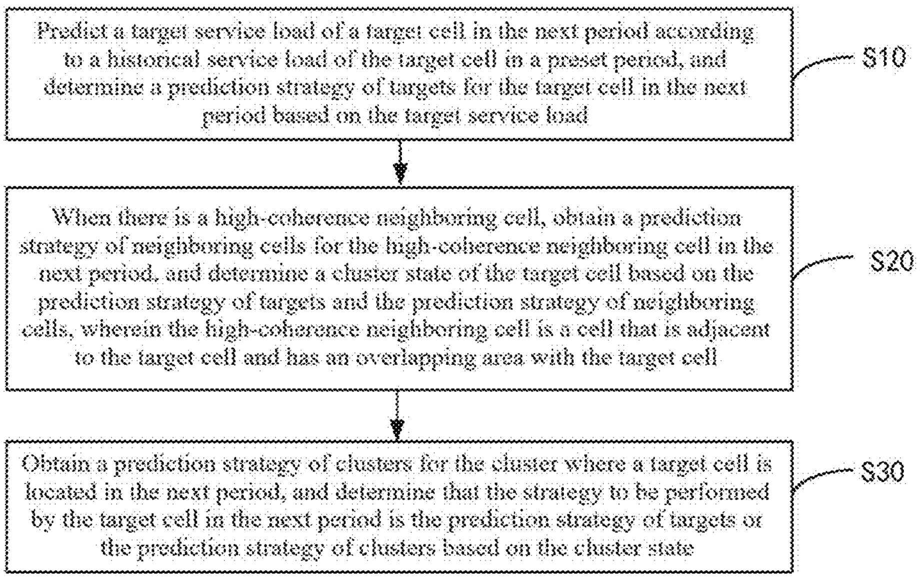
FIG. 2 is a schematic flow diagram of a first embodiment of an inter-cell interference coordination method of this disclosure.

Referring to FIG. 2, FIG. 2 is a schematic flow diagram of a first embodiment of the inter-cell interference coordination method of this disclosure.

In this embodiment, the inter-cell interference coordination method comprises steps S10 to S30 as follows.

Step S10: a target service load of a target cell in the next period is predicted according to a historical service load of the target cell in a preset period, and a prediction strategy of targets for the target cell in the next period is determined based on the target service load.

In this embodiment, predicting a service load in the next period is based on a historical service load of the target cell in a preset period. The preset period can be a latest period, three periods, or a customized period. The centralized point divides all of its cells of the specified frequency point and the specified type into one or more clusters according to the overlapping coverage relationship among cells. The specified type refers to a specified standard (for example 4G or 5G wireless access network) and/or a specified cell state (for example a DSS cell, a super cell, etc.). A high-coherence neighboring cell refers to all co-frequency neighboring cells that have an overlapping coverage area with this cell.

Figure 3:
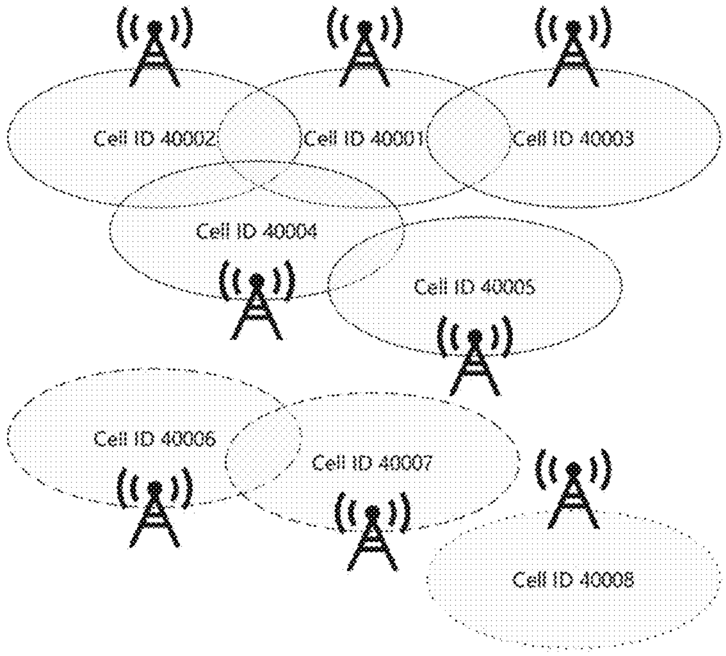
FIG. 3 is a schematic diagram of cell distribution and mutual coverage relationship in the inter-cell interference coordination method of this disclosure.

FIG. 3 provides the cell distribution and mutual coverage relationship of this embodiment. In accordance with the scenario in FIG. 3, the high-coherence relationship among 8 cells is shown in Table 1.

TABLE 1

| | 40001 | 40002 | 40003 | 40004 | 40005 | 40006 | 40007 | 40008 |
|---|---|---|---|---|---|---|---|---|
| 40001 | | high-coherence | high-coherence | high-coherence | | | | |
| 40002 | high-coherence | | | high-coherence | | | | |
| 40003 | high-coherence | | | | | | | |
| 40004 | high-coherence | high-coherence | | | high-coherence | | | |
| 40005 | | | | high-coherence | | | | |
| 40006 | | | | | | | high-coherence | |
| 40007 | | | | | | high-coherence | | |
| 40008 | | | | | | | | |

The centralized point obtains a list of high-coherence co-frequency cells of the above 8 cells and marks these 8 cells as "to be queried".

The centralized point generates a cluster "cluster 1" where a target cell is located, adds cell 40001 to the "cluster 1", and marks it as "queried"; the centralized point adds all high-coherence neighboring cells 40002, 40003 and 40004 of the cell 40001 to the "cluster 1", and marks these 3 cells as "queried"; and the centralized point adds a high-coherence neighboring cell 40005 of the cell 40004 to the "cluster 1", and marks it as "queried".

The high-coherence neighboring cells of all cells in the "cluster 1" are comprised in the "cluster 1", as a result, the division of the "cluster 1" is completed; the centralized point generates a cluster "cluster 2" where a target cell is located, adds cell 40006 to the "cluster 2" and marks it as "queried"; and the centralized point adds a high-coherence neighboring cell 40007 of the cell 40006 to the "cluster 2", and marks it as "queried".

The high-coherence neighboring cells of all cells in the "cluster 2" are comprised in the "cluster 2", as a result, the division of the "cluster 2" is completed; the centralized point generates a cluster "cluster 3" where a target cell is located, adds cell 40008 to the "cluster 3", and marks it as "queried".

The high-coherence neighboring cells of all cells in the "cluster 3" are comprised in the "cluster 3", as a result, the division of the "cluster 3" is completed.

All 8 cells of the centralized point have been marked as "queried".

S20: when there is a high-coherence neighboring cell, a prediction strategy of neighboring cells for the high-coherence neighboring cell in the next period is obtained, and a cluster state of the target cell is determined based on the prediction strategy of targets and the prediction strategy of neighboring cells, wherein the high-coherence neighboring cell is a cell that is adjacent to the target cell and has an overlapping area with the target cell.

In this embodiment, the centralized point determines a selectable strategy for each of its clusters in the next period. Since this method adopts periodic adjustment based on a cluster-based centralized inter-cell interference coordination mechanism and the period is set in advance, the next period refers to the most recent period in the future. A selectable strategy in the next period refers to a strategy that is selected by each cell in the next period based on its prediction of loads in the next period and other related information. The load here includes but is not limited to the uplink/downlink PRB utilization rate of logical cells, the number of RRC users, the number of activated users, etc.

Figure 4:
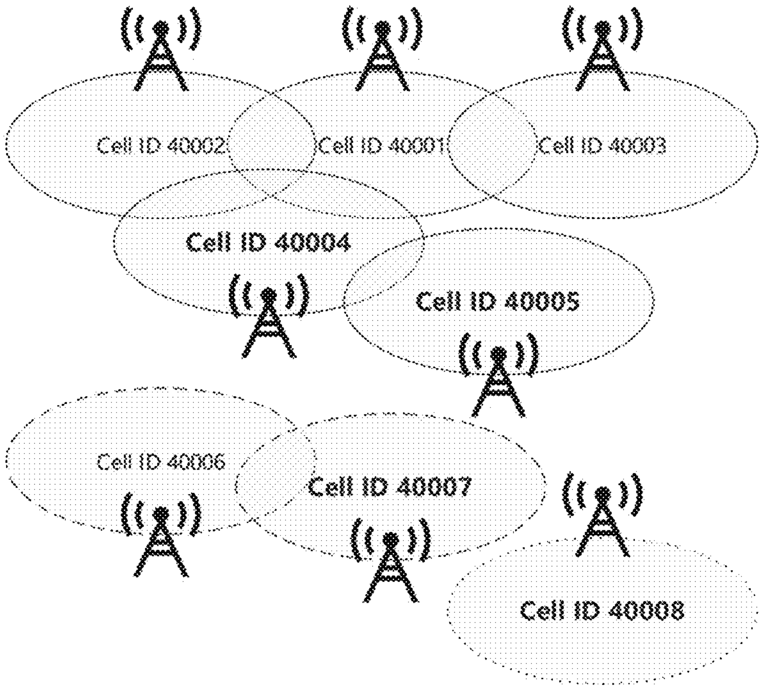
FIG. 4 is a schematic diagram of selectable strategies for cells in the next period in the inter-cell interference coordination method of this disclosure.

FIG. 4 shows selectable strategies for the 8 cells in the next period, the cells with an ID in bold font indicate that they are intended to enter a pure 5G state in the next period, and the other cells are intended to be in a 4G/5G DSS state in the next period.

The DSS 4G of cells 40004, 40005, 40007 and 40008 predicts a light load in the next period, and the load of their basic coverage cells in the next period is light, too, therefore, the above 4 cells are intended to turn off DSS 4G in the next period and make the entire spectrum resource available to 5G, that is, they enter the pure 5G state. The DSS 4G of cells 40001, 40002, 40003 and 40006 predicts a heavy load in the next period, therefore, they are intended to remain in the 4G/5G DSS state in the next period.

Assuming that we define that if more than 40% of cells in a cluster are intended to be in the 4G/5G DSS state in the next period, then the selectable strategy for the entire cluster in the next period is the 4G/5G DSS state, otherwise it is the pure 5G state. Then the selectable strategy for the "cluster 1" and the "cluster 2" in the next period is the 4G/5G DSS state, and the selectable strategy for the "cluster 3" in the next period is the pure 5G state.

S30: a prediction strategy of clusters for the cluster where a target cell is located in the next period is obtained, and it is determined that the strategy to be performed by the target cell in the next period is the prediction strategy of targets or the prediction strategy of clusters based on the cluster state.

In this embodiment, the centralized point determines the cluster state of all its cells of the specified frequency point and the specified type according to the division of clusters and whether selectable strategies of neighboring cells in the next period are consistently coordinated.

In this embodiment, the centralized point determines the cluster state of all its cells of the specified frequency point and the specified type.

The centralized point marks the "cluster 1", the "cluster 2" and the "cluster 3" as "to be queried", and deletes marks of the 8 cells; the centralized point selects the "cluster 1" and marks it as "queried", and marks cells 40003 and 40005 as "potential intra-cluster" cells; the centralized point generates a "small cluster 1-1", and adds the "potential intra-cluster" cell 40003 to the "small cluster 1-1".

The centralized point adds a high-coherence neighboring cell 40001 of the cell 40003 to the "small cluster 1-1"; all high-coherence neighboring cells of the "potential intra-cluster" cells in the "small cluster 1-1" are comprised in the "small cluster 1-1", therefore, the generation of the "small cluster 1-1" is completed; the "potential intra-cluster" cells+ the "cluster-edge" cells in the "small cluster 1-1" account for 50%, which exceeds the predetermined threshold of 30%, therefore, the mark of cell 40003 in the "small cluster 1-1" is changed to "intra-cluster", and the mark of cell 40001 is changed to "cluster-edge".

The centralized point generates a "small cluster 1-2", and adds the "potential intra-cluster" cell 40005 to the "small cluster 1-2"; the centralized point adds a high-coherence neighboring cell 40004 of the cell 40005 to the "small cluster 1-2"; all high-coherence neighboring cells of the "potential intra-cluster" cells in the "small cluster 1-2" are comprised in the "small cluster 1-2", therefore, the generation of the "small cluster 1-2" is completed.

The "potential intra-cluster" cells+the "cluster-edge" cells in the "small cluster 1-2" account for 50%, which exceeds the predetermined threshold of 30%, therefore, the mark of cell 40005 in the "small cluster 1-2" is changed to "intra-cluster", and the mark of cell 40004 is changed to "cluster-edge".

There are no "potential intra-cluster" cells in the "cluster 1", therefore, the unmarked cell 40002 in the "cluster 1" is marked as "outside-the-cluster"; the centralized point selects the "cluster 2" and marks it as "queried".

There are no "potential intra-cluster" cells or "intra-cluster" cells or "cluster-edge" cells in the "cluster 2", therefore, cells 40006 and 40007 in the "cluster 2" are marked as "intra-cluster", and the selectable strategy of these two cells in the next period is changed to the 4G/5G DSS state which is the selectable strategy of the "cluster 2" in the next period.

The centralized point selects the "cluster 3", marks it as "queried", and marks cell 40008 as a "potential intra-cluster" cell.

The centralized point generates a "small cluster 1-3", and adds the "potential intra-cluster" cell 40008 to the "small cluster 1-3"; all high-coherence neighboring cells of "potential intra-cluster" cells in the "small cluster 1-3" are comprised in the "small cluster 1-3", therefore, the generation of the "small cluster 1-3" is completed; the "potential intra-cluster" cells+the "cluster-edge" cells in the "small cluster 1-3" account for 100%, which exceeds the predetermined threshold of 30%, therefore, the mark of cell 40008 in the "small cluster 1-3" is changed to "intra-cluster".

There are no "potential intra-cluster" cells in the "cluster 3", and all clusters of the centralized point are marked as "queried".

This embodiment provides an inter-cell interference coordination method, the method comprises: predicting a target service load of a target cell in the next period according to a historical service load of the target cell in a preset period, and determining a prediction strategy of targets for the target cell in the next period based on the target service load; when there is a high-coherence neighboring cell, obtaining a prediction strategy of neighboring cells for the high-coherence neighboring cell in the next period, and determining a cluster state of the target cell based on the prediction strategy of targets and the prediction strategy of neighboring cells, wherein the high-coherence neighboring cell is a cell that is adjacent to the target cell and has an overlapping area with the target cell; and obtaining a prediction strategy of clusters for the cluster where the target cell is located in the next period, and determining that the strategy to be performed by the target cell in the next period is the prediction strategy of targets or the prediction strategy of clusters based on the cluster state. By means of the above method, this embodiment comprises: predicting a load in the next period according to the load of the target cell so as to obtain a prediction interference coordination strategy, then determining the cluster state of the target cell by the relationship between the prediction interference coordination strategy and the cluster interference coordination strategy, and determining the interference coordination strategy to be performed by the target cell in the next period according to the cluster state of the target cell. As a result, this improves the accuracy of selecting the interference coordination strategy by different cells, avoids mutual signal interference among cells, improves signal strength among centralized cells, and solves the technical problem of signal difference among centralized cells.

Figure 5:
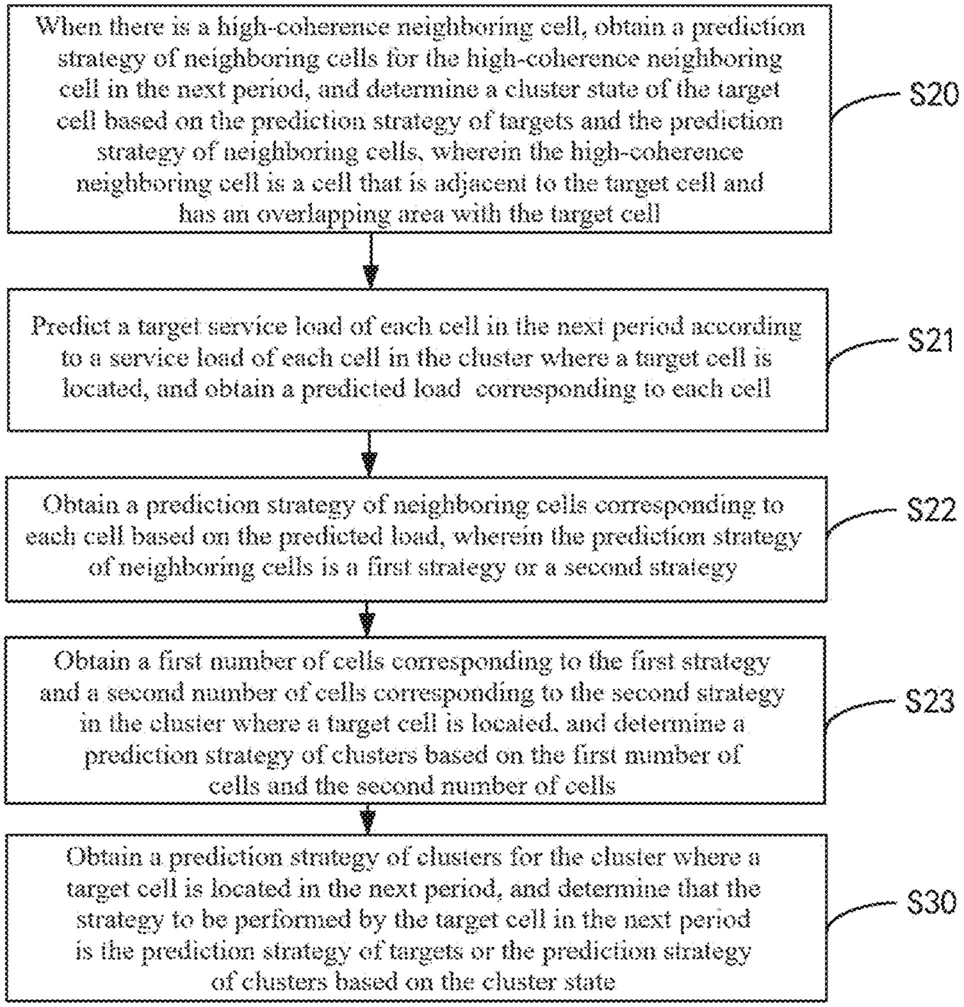
FIG. 5 is a schematic flow diagram of a second embodiment of the inter-cell interference coordination method of this disclosure.

Referring to FIG. 5, FIG. 5 is a schematic flow diagram of a second embodiment of the inter-cell interference coordination method of this disclosure.

Based on the above embodiment shown in FIG. 2, this embodiment further comprises steps S21 to S23 prior to the step S30.

Step S21: a target service load of each cell in the next period is predicted according to a service load of each cell in the cluster where a target cell is located, and a predicted load corresponding to each cell is obtained.

Step S22: a prediction strategy of neighboring cells corresponding to each cell is obtained based on the predicted load, wherein the prediction strategy of neighboring cells is a first strategy or a second strategy.

Step S23: a first number of cells corresponding to the first strategy and a second number of cells corresponding to the second strategy in the cluster where a target cell is located are obtained, and a prediction strategy of clusters is determined based on the first number of cells and the second number of cells.

Further, in this embodiment, the step S23 comprises: obtaining a total number of cells in the cluster where a target cell is located, and calculating a first ratio and a second ratio, wherein the first ratio is the ratio of the first number of cells to the total number of cells, and the second ratio is the ratio of the second number of cells to the total number of cells; and determining the prediction strategy of clusters based on a first threshold, the first ratio and the second ratio.

In this embodiment, as shown in FIG. 4, the 8 cells each perform a periodic prediction of loads and a selectable strategy for each cell in the next period is selected based on the prediction results, the selection results are described below. Here we set the prediction period to 15 min, which is also the period for each cell to adjust its inter-cell interference coordination means. FIG. 4 shows selectable strategies for the 8 cells in the next period, the cells with an ID in bold font indicate that they are intended to enter the pure 5G state in the next period, and the other cells are intended to be in the 4G/5G DSS state in the next period.

The DSS 4G of cells 40004, 40005, 40007 and 40008 predicts a light load in the next period, and the load of their basic coverage cells in the next period is light, too, therefore, the above 4 cells are intended to turn off DSS 4G in the next period and make the entire spectrum resource available to 5G, that is, they enter the pure 5G state. The DSS 4G of cells 40001, 40002, 40003 and 40006 predicts a heavy load in the next period, therefore, they are intended to remain in the 4G/5G DSS state in the next period.

Assuming that we define that if more than 40% of cells in a cluster are intended to be in the 4G/5G DSS state in the next period, then the selectable strategy for the entire cluster in the next period is the 4G/5G DSS state, otherwise it is the pure 5G state. Then the selectable strategy for the "cluster 1" and the "cluster 2" in the next period is the 4G/5G DSS state, and the selectable strategy for the "cluster 3" in the next period is the pure 5G state.

The centralized point determines the cluster state of all its cells of the specified frequency point and the specified type.

The centralized point marks the "cluster 1", the "cluster 2" and the "cluster 3" as "to be queried", and deletes marks of the 8 cells; the centralized point selects the "cluster 1" and marks it as "queried", and marks cells 40003 and 40005 as "potential intra-cluster" cells; the centralized point generates a "small cluster 1-1", and adds the "potential intra-cluster" cell 40003 to the "small cluster 1-1".

The centralized point adds a high-coherence neighboring cell 40001 of the cell 40003 to the "small cluster 1-1"; all high-coherence neighboring cells of the "potential intra-cluster" cells in the "small cluster 1-1" are comprised in the "small cluster 1-1", therefore, the generation of the "small cluster 1-1" is completed; the "potential intra-cluster" cells+ the "cluster-edge" cells in the "small cluster 1-1" account for 50%, which exceeds the predetermined threshold of 30%, therefore, the mark of cell 40003 in the "small cluster 1-1" is changed to "intra-cluster", and the mark of cell 40001 is changed to "cluster-edge".

The centralized point generates a "small cluster 1-2", and adds the "potential intra-cluster" cell 40005 to the "small cluster 1-2", the centralized point adds a high-coherence neighboring cell 40004 of cell 40005 to the "small cluster 1-2"; all high-coherence neighboring cells of the "potential intra-cluster" cells in the "small cluster 1-2" are comprised in the "small cluster 1-2", therefore, the generation of the "small cluster 1-2" is completed.

The "potential intra-cluster" cells+the "cluster-edge" cells in the "small cluster 1-2" account for 50%, which exceeds the predetermined threshold of 30%, therefore, the mark of cell 40005 in the "small cluster 1-2" is changed to "intra-cluster", and the mark of cell 40004 is changed to "cluster-edge".

There are no "potential intra-cluster" cells in the "cluster 1", therefore, the unmarked cell 40002 in the "cluster 1" is marked as "outside-the-cluster"; the centralized point selects the "cluster 2" and marks it as "queried".

There are no "potential intra-cluster" cells or "intra-cluster" cells or "cluster-edge" cells in the "cluster 2", therefore, cells 40006 and 40007 in the "cluster 2" are marked as "intra-cluster", and the selectable strategy of these two cells in the next period is changed to the 4G/5GDSS state which is the selectable strategy of the "cluster 2" in the next period.

The centralized point selects the "cluster 3", marks it as "queried", and marks cell 40008 as a "potential intra-cluster" cell.

The centralized point generates a "small cluster 3-1", and adds the "potential intra-cluster" cell 40008 to the "small cluster 3-1"; all high-coherence neighboring cells of the "potential intra-cluster" cells in the "small cluster 3-1" are comprised in the "small cluster 3-1", therefore, the generation of the "small cluster 3-1" is completed; the "potential intra-cluster" cells+the "cluster-edge" cells in the "small cluster 3-1" account for 100%, which exceeds the predetermined threshold of 30%, therefore, the mark of cell 40008 in the "small cluster 3-1" is changed to "intra-cluster".

There are no "potential intra-cluster" cells in the "cluster 3", and all clusters of the centralized point are marked as "queried".

This embodiment provides an inter-cell interference coordination method, the method comprises: predicting a target service load of a target cell in the next period according to a historical service load of the target cell in a preset period, and determining the prediction strategy of targets for the target cell in the next period based on the target service load;

when there is a high-coherence neighboring cell, obtaining a prediction strategy of neighboring cells for the high-coherence neighboring cell in the next period, and determining a cluster state of the target cell based on the prediction strategy of targets and the prediction strategy of neighboring cells, wherein the high-coherence neighboring cell is a cell that is adjacent to the target cell and has an overlapping area with the target cell; and obtaining a prediction strategy of clusters for the cluster where the target cell is located in the next period, and determining that the strategy to be performed by the target cell in the next period is the prediction strategy of targets or the prediction strategy of clusters based on the cluster state. By means of the above method, this embodiment comprises: predicting a load in the next period according to a load of the target cell so as to obtain a prediction interference coordination strategy, then determining the cluster state of the target cell by the relationship between the prediction interference coordination strategy and the cluster interference coordination strategy, and determining the interference coordination strategy to be performed by the target cell in the next period according to the cluster state of the target cell. As a result, this improves the accuracy of selecting the interference coordination strategy by different cells, avoids signal interference among cells, improves signal strength among centralized cells, and solves the technical problem of signal difference among centralized cells.

Figure 6:
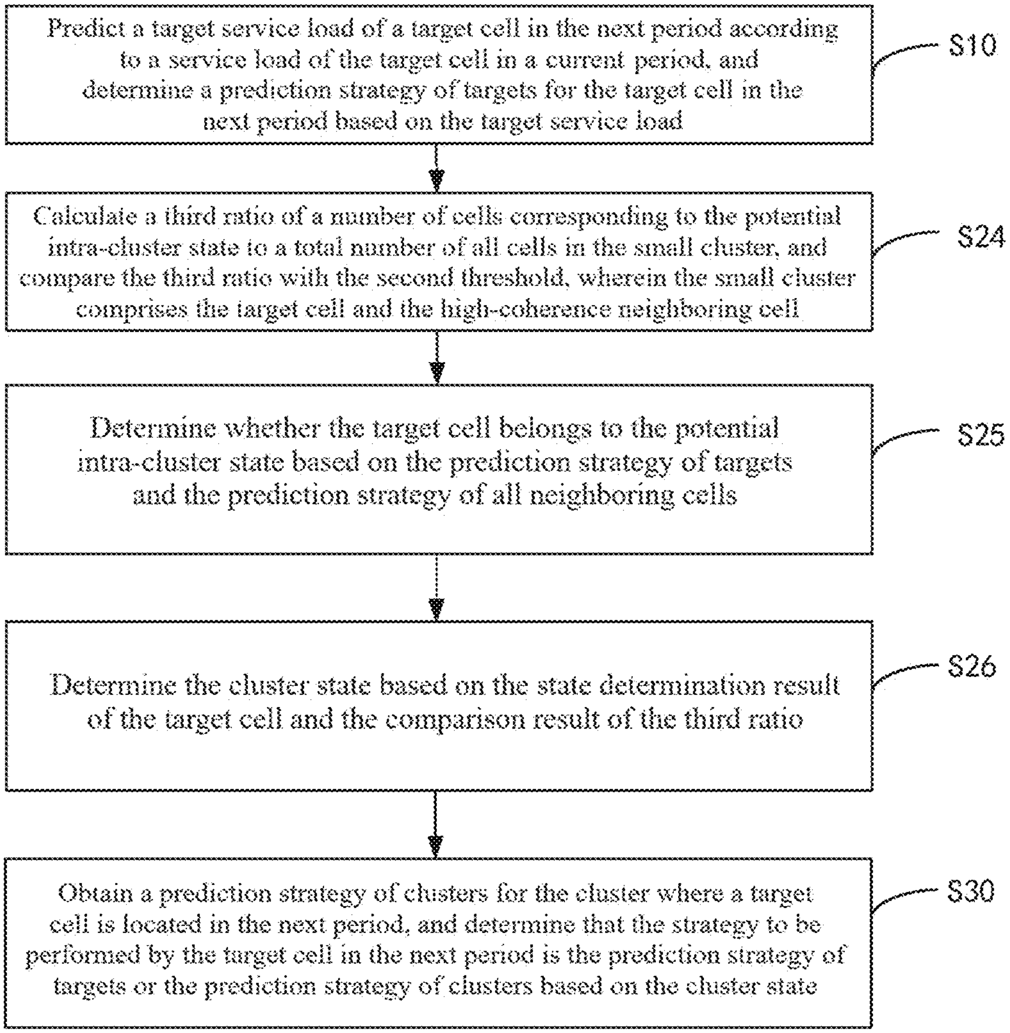
FIG. 6 is a schematic flow diagram of a third embodiment of the inter-cell interference coordination method of this disclosure.

Referring to FIG. 6, FIG. 6 is a schematic flow diagram of a third embodiment of an inter-cell interference coordination method of this disclosure.

Based on the above embodiment shown in FIG. 2, in this embodiment, the step S20 comprises steps S24 to S26.

Step S24: a third ratio of a number of cells corresponding to the "potential intra-cluster" state to a total number of all cells in the small cluster is calculated, and the third ratio is compared with a second threshold, wherein the small cluster comprises the target cell and the high-coherence neighboring cell.

Step S25: it is determined whether the target cell belongs to the "potential intra-cluster" state based on the prediction strategy of targets and the prediction strategy of all neighboring cells.

Step S26: the cluster state is determined based on the state determination result of the target cell and the comparison result of the third ratio.

In this embodiment, the centralized point determines the cluster state of all its cells of the specified frequency point and the specified type.

The centralized point marks the "cluster 1", the "cluster 2" and the "cluster 3" as "to be queried", and deletes marks of the 8 cells; the centralized point selects the "cluster 1" and marks it as "queried", and marks cells 40003 and 40005 as "potential intra-cluster" cells; the centralized point generates a "small cluster 1-1", and adds the "potential intra-cluster" cell 40003 to the "small cluster 1-1".

The centralized point adds a high-coherence neighboring cell 40001 of the cell 40003 to the "small cluster 1-1"; all high-coherence neighboring cells of the "potential intra-cluster" cells in the "small cluster 1-1" are comprised in the "small cluster 1-1", therefore, the generation of the "small cluster 1-1" is completed; the "potential intra-cluster" cells+ the "cluster-edge" cells in the "small cluster 1-1" account for 50%, which exceeds the predetermined threshold of 30%, therefore, the mark of cell 40003 in the "small cluster 1-1" is changed to "intra-cluster", and the mark of the cell 40001 is changed to "cluster-edge".

The centralized point generates a "small cluster 1-2", and adds the "potential intra-cluster" cell 40005 to the "small cluster 1-2", the centralized point adds a high-coherence neighboring cell 40004 of the cell 40005 to the "small cluster 1-2"; all high-coherence neighboring cells of the "potential intra-cluster" cells in the "small cluster 1-2" are comprised in the "small cluster 1-2", therefore, the generation of the "small cluster 1-2" is completed.

The "potential intra-cluster" cells+the "cluster-edge" cells in the "small cluster 1-2" account for 50%, which exceeds the predetermined threshold of 30%, therefore, the mark of cell 40005 in the "small cluster 1-2" is changed to "intra-cluster", and the mark of the cell 40004 is changed to "cluster-edge".

There are no "potential intra-cluster" cells in the "cluster 1", therefore, the unmarked cell 40002 in the "cluster 1" is marked as "outside-the-cluster"; the centralized point selects the "cluster 2" and marks it as "queried".

There are no "potential intra-cluster" cells or "intra-cluster" cells or "cluster-edge" cells in the "cluster 2", therefore, cells 40006 and 40007 in the "cluster 2" are marked as "intra-cluster", and the selectable strategy of these two cells in the next period is changed to the 4G/5G DSS state which is the selectable strategy of the "cluster 2" in the next period.

The centralized point selects the "cluster 3", marks it as "queried", and marks cell 40008 as a "potential intra-cluster" cell.

The centralized point generates a "small cluster 3-1", and adds the "potential intra-cluster" cell 40008 to the "small cluster 3-1"; all high-coherence neighboring cells of the "potential intra-cluster" cells in the "small cluster 3-1" are comprised in the "small cluster 3-1", therefore, the generation of the "small cluster 3-1" is completed; the "potential intra-cluster" cells+the "cluster-edge" cells in the "small cluster 3-1" account for 100%, which exceeds the predetermined threshold of 30%, therefore, the mark of the cell 40008 in the "small cluster 3-1" is changed to "intra-cluster".

There are no "potential intra-cluster" cells in the "cluster 3", and all clusters of the centralized point are marked as "queried".

This embodiment provides an inter-cell interference coordination method, the method comprises: predicting a target service load of a target cell in the next period according to a historical service load of the target cell in a preset period, and determining the prediction strategy of targets for the target cell in the next period based on the target service load; when there is a high-coherence neighboring cell, obtaining a prediction strategy of neighboring cells for the high-coherence neighboring cell in the next period, and determining a cluster state of the target cell based on the prediction strategy of targets and the prediction strategy of neighboring cells, wherein the high-coherence neighboring cell is a cell that is adjacent to the target cell and has an overlapping area with the target cell; and obtaining a prediction strategy of clusters for the cluster where the target cell is located in the next period, and determining that the strategy to be performed by the target cell in the next period is the prediction strategy of targets or the prediction strategy of clusters based on the cluster state. By means of the above method, this embodiment comprises: predicting a load in the next period according to a load of the target cell so as to obtain a prediction interference coordination strategy, then determining the cluster state of the target cell by the relationship between the prediction interference coordination strategy and the cluster interference coordination strategy, and determining the interference coordination strategy to be performed by the target cell in the next period according to the cluster state of the target cell. As a result, this improves the accuracy of selecting the interference coordination strategy by different cells, avoids signal interference among cells, improves signal strength among centralized cells, and solves the technical problem of signal difference among centralized cells.

Based on the above embodiment shown in FIG. 6, in this embodiment, the step S26 comprises: if the target cell belongs to the "potential intra-cluster" state and the third ratio is greater than the second threshold, then it is determined that the cluster state is the "intra-cluster" state; if the target cell belongs to the "potential intra-cluster" state and the third ratio is not greater than the second threshold, then it is determined that the cluster state is the "outside-the-cluster" state.

Based on the above embodiment shown in FIG. 6, after the step S24, this embodiment further comprises: if the target cell does not belong to the "potential intra-cluster" state and the third ratio is greater than the second threshold, then it is determined that the cluster state is the "cluster-edge" state; if the target cell does not belong to the "potential intra-cluster" state and the third ratio is not greater than the second threshold, then it is determined that the cluster state is the "outside-the-cluster" state.

In this embodiment, the centralized point marks the "cluster 1", the "cluster 2" and the "cluster 3" as "to be queried", and deletes marks of the 8 cells.

The centralized point selects the "cluster 1", marks it as "queried", and marks cell 40003 and 40005 as "potential intra-cluster" cells.

The centralized point generates a "small cluster 1-1", and adds the "potential intra-cluster" cell 40003 to the "small cluster 1-1".

The centralized point adds a high-coherence neighboring cell 40001 of the cell 40003 to the "small cluster 1-1"; all high-coherence neighboring cells of the "potential intra-cluster" cells in the "small cluster 1-1" are comprised in the "small cluster 1-1", therefore, the generation of the "small cluster 1-1" is completed; the "potential intra-cluster" cells+ the "cluster-edge" cells in the "small cluster 1-1" account for 50%, which exceeds the predetermined threshold of 30%, therefore, the mark of the cell 40003 in the "small cluster 1-1" is changed to "intra-cluster", and the mark of the cell 40001 is changed to "cluster-edge".

The centralized point generates a "small cluster 1-2", and adds the "potential intra-cluster" cell 40005 to the "small cluster 1-2", the centralized point adds a high-coherence neighboring cell 40004 of the cell 40005 to the "small cluster 1-2"; all high-coherence neighboring cells of the "potential intra-cluster" cells in the "small cluster 1-2" are comprised in the "small cluster 1-2", therefore, the generation of the "small cluster 1-2" is completed.

The "potential intra-cluster" cells+the "cluster-edge" cells in the "small cluster 1-2" account for 50%, which exceeds the predetermined threshold of 30%, therefore, the mark of the cell 40005 in the "small cluster 1-2" is changed to "intra-cluster", and the mark of the cell 40004 is changed to "cluster-edge".

There are no "potential intra-cluster" cells in the "cluster 1", therefore, the unmarked cell 40002 in the "cluster 1" is marked as "outside-the-cluster"; the centralized point selects the "cluster 2" and marks it as "queried".

There are no "potential intra-cluster" cells or "intra-cluster" cells or "cluster-edge" cells in the "cluster 2", therefore, cells 40006 and 40007 in the "cluster 2" are marked as "intra-cluster", and the selectable strategy of these two cells in the next period is changed to the 4G/5G DSS state which is the selectable strategy of the "cluster 2" in the next period.

The centralized point selects the "cluster 3", marks it as "queried", and marks cell 40008 as a "potential intra-cluster" cell.

The centralized point generates a "small cluster 3-1", and adds the "potential intra-cluster" cell 40008 to the "small cluster 3-1"; all high-coherence neighboring cells of the "potential intra-cluster" cells in the "small cluster 3-1" are comprised in the "small cluster 3-1", therefore, the generation of the "small cluster 3-1" is completed; the "potential intra-cluster" cells+the "cluster-edge" cells in the "small cluster 3-1" account for 100%, which exceeds the predetermined threshold of 30%, therefore, the mark of the cell 40008 in the "small cluster 3-1" is changed to "intra-cluster".

There are no "potential intra-cluster" cells in the "cluster 3", and all clusters of the centralized point are marked as "queried".

In this embodiment, the centralized point determines the cluster state of all its cells of the specified frequency point and the specified type.

The centralized point marks the "cluster 1", the "cluster 2" and the "cluster 3" as "to be queried", and deletes marks of the 8 cells; the centralized point selects the "cluster 1" and marks it as "queried", and marks cells 40003 and 40005 as "potential intra-cluster" cells; the centralized point generates the "small cluster 1-1", and adds the "potential intra-cluster" cell 40003 to the "small cluster 1-1".

The centralized point adds a high-coherence neighboring cell 40001 of the cell 40003 to the "small cluster 1-1"; all high-coherence neighboring cells of the "potential intra-cluster" cells in the "small cluster 1-1" are comprised in the "small cluster 1-1", therefore, the generation of the "small cluster 1-1" is completed; the "potential intra-cluster" cells+ the "cluster-edge" cells in the "small cluster 1-1" account for 50%, which exceeds the predetermined threshold of 30%, therefore, the mark of the cell 40003 in the "small cluster 1-1" is changed to "intra-cluster", and the mark of cell 40001 is changed to "cluster-edge".

The centralized point generates the "small cluster 1-2", and adds the "potential intra-cluster" cell 40005 to the "small cluster 1-2", the centralized point adds a high-coherence neighboring cell 40004 of the cell 40005 to the "small cluster 1-2"; all high-coherence neighboring cells of the "potential intra-cluster" cells in the "small cluster 1-2" are comprised in the "small cluster 1-2", therefore, the generation of the "small cluster 1-2" is completed.

The "potential intra-cluster" cells+the "cluster-edge" cells in the "small cluster 1-2" account for 50%, which exceeds the predetermined threshold of 30%, therefore, the mark of the cell 40005 in the "small cluster 1-2" is changed to "intra-cluster", and the mark of the cell 40004 is changed to "cluster-edge".

There are no "potential intra-cluster" cells in the "cluster 1", therefore, the unmarked cell 40002 in the "cluster 1" is marked as "outside-the-cluster"; the centralized point selects the "cluster 2" and marks it as "queried".

There are no "potential intra-cluster" cells or "intra-cluster" cells or "cluster-edge" cells in the "cluster 2", therefore, cells 40006 and 40007 in the "cluster 2" are marked as "intra-cluster", and the selectable strategy of these two cells in the next period is changed to the 4G/5G DSS state which is the selectable strategy of "cluster 2" in the next period.

The centralized point selects the "cluster 3", marks it as "queried", and marks cell 40008 as a "potential intra-cluster" cell.

The centralized point generates the "small cluster 3-1", and adds the "potential intra-cluster" cell 40008 to the "small cluster 3-1"; all high-coherence neighboring cells of the "potential intra-cluster" cells in the "small cluster 3-1" are comprised in the "small cluster 3-1", therefore, the generation of the "small cluster 3-1" is completed; the "potential intra-cluster" cells+the "cluster-edge" cells in the "small cluster 3-1" account for 100%, which exceeds the predetermined threshold of 30%, therefore, the mark of cell 40008 in the "small cluster 3-1" is changed to "intra-cluster".

There are no "potential intra-cluster" cells in the "cluster 3", and all clusters of the centralized point are marked as "queried".

This embodiment provides an inter-cell interference coordination method, the method comprises: predicting a target service load of a target cell in the next period according to a historical service load of the target cell in a preset period, and determining a prediction strategy of targets for the target cell in the next period based on the target service load; when there is a high-coherence neighboring cell, obtaining a prediction strategy of neighboring cells for the high-coherence neighboring cell in the next period, and determining a cluster state of the target cell based on the prediction strategy of targets and the prediction strategy of neighboring cells, wherein the high-coherence neighboring cell is a cell that is adjacent to the target cell and has an overlapping area with the target cell; and obtaining a prediction strategy of clusters for the cluster where the target cell is located in the next period, and determining that the strategy to be performed by the target cell in the next period is the prediction strategy of targets or the prediction strategy of clusters based on the cluster state. By means of the above method, this embodiment comprises: predicting a load in the next period according to a load of the target cell so as to obtain a prediction interference coordination strategy, then determining the cluster state of the target cell by the relationship between the prediction interference coordination strategy and the cluster interference coordination strategy, and determining the interference coordination strategy to be performed by the target cell in the next period according to the cluster state of the target cell. As a result, this improves the accuracy of selecting the interference coordination strategy by different cells, avoids signal interference among cells, improves signal strength among centralized cells, and solves the technical problem of signal difference among centralized cells.

Based on the above embodiment shown in FIG. 2, prior to step S10, this embodiment further comprises: dividing the target cell, the high-coherence neighboring cell, and cells having an overlapping area with the high-coherence neighboring cell into a new cluster, and making the new cluster as the cluster where the target cell is located.

Based on the above embodiment shown in FIG. 2, determining that the strategy to be performed by the target cell in the next period is the prediction strategy of targets or the prediction strategy of clusters based on the cluster state further comprises: if the cluster state is the "cluster-edge" state or the "intra-cluster" state, then it is determined that the strategy to be performed in the next period is the prediction strategy of targets; and if the cluster state is the "outside-of-cluster" state, then it is determined that the strategy to be performed in the next period is the cluster interference coordination strategy.

In this embodiment, referring to Table 2, the centralized point determines the interference coordination strategy to be performed by all of its cells of the specified frequency point and the specified type in the next period.

TABLE 2

| mark of cells | Strategy to be performed by the cell in the next period |
|---|---|
| Outside-of-cluster | Enable the selectable strategies for the cluster where the cell is located in the next period and the corresponding inter-cell interference coordination strategy |
| Intra-cluster | Enable the selectable strategies for the cell in the next period and the state and the inter-cell interference coordination strategy corresponding to the "intra-cluster" state |
| Cluster-edge | Enable the selectable strategies for the cell in the next period and the state and the inter-cell interference coordination strategy corresponding to the "cluster-edge" state |

Cells 40005 and 40008 are in the "intra-cluster" state and the selectable strategy for these cells in the next period is the "pure 5G": the "5G" state will be enabled in the next period without adopting any specific inter-cell interference coordination strategy.

Cells 40003, 40006 and 40007 are in the "intra-cluster" state and the selectable strategy for these cells in the next period is the "4G/5G DSS" state: the cells will enable the "4G/5G DSS" state in the next period, and dynamically adjust whether to enable a symbol-level rate matching, by means of adaptive switching for the same, and based on the intensity of CRS interference from neighboring co-frequency 4G cells with varying PCI (Physical Cell Identifier) mod 3 that effects each user. In conjunction with bandwidth adaptation and according to the interference when measuring different RBs by each user on CSI IM, RBs (Resource Block) that are stable and have high interference can be avoided during scheduling.

Cell 40004 is in the "cluster-edge" state and the selectable strategy for the cell in the next period is the "pure 5G" state: the cell will enable the "pure 5G" state in the next period, and dynamically adjust whether to enable the symbol-level rate matching, by means of adaptive switching for the same, and based on the intensity of CRS interference from neighboring co-frequency 4G cells that effects each user. In conjunction with bandwidth adaptation and according to the interference when measuring different RBs by each user on CSI IM (Channel State Information Interference Measurement), RBs that are stable and have high interference can be avoided during scheduling.

Cell 40001 is in the "cluster-edge" state and the selectable strategy for the cell in the next period is the "4G/5G DSS" state: the cell will enable the "4G/5G DSS" state in the next period, and dynamically adjust whether to enable the symbol-level rate matching, by means of adaptive switching for the same, and based on the intensity of CRS interference from neighboring co-frequency 4G cells with varying PCF mod 3 that effects each user. In conjunction with bandwidth adaptation and according to the interference when measuring different RBs by each user on CSI IM, RBs that are stable and have high interference can be avoided during scheduling.

Cell 40002 is in the "outside-of-cluster" state and the selectable strategy for the cluster where the cell is located in the next period is the "4G/5G DSS" state: the cell will enable the "4G/5G DSS" state in the next period, and dynamically adjust whether to enable the symbol-level rate matching, by means of adaptive switching for the same, and based on the intensity of CRS interference from neighboring co-frequency 4G cells with varying PCF mod 3 that effects each user. In conjunction with bandwidth adaptation and according to the interference when measuring different RBs by each user on CSI IM, RBs that are stable and have high interference can be avoided during scheduling.

This embodiment provides an inter-cell interference coordination method, the method comprises: predicting a target service load of a target cell in the next period according to a historical service load of the target cell in a preset period, and determining a prediction strategy of targets for the target cell in the next period based on the target service load; when there is a high-coherence neighboring cell, obtaining a prediction strategy of neighboring cells for the high-coherence neighboring cell in the next period, and determining a cluster state of the target cell based on the prediction strategy of targets and the prediction strategy of neighboring cells, wherein the high-coherence neighboring cell is a cell that is adjacent to the target cell and has an overlapping area with the target cell; and obtaining a prediction strategy of clusters for the cluster where the target cell is located in the next period, and determining that the strategy to be performed by the target cell in the next period is the prediction strategy of targets or the prediction strategy of clusters based on the cluster state. By means of the above method, this embodiment comprises: predicting a load in the next period according to a load of the target cell so as to obtain a prediction interference coordination strategy, then determining the cluster state of the target cell by the relationship between the prediction interference coordination strategy and the cluster interference coordination strategy, and determining the interference coordination strategy to be performed by the target cell in the next period according to the cluster state of the target cell. As a result, this improves the accuracy of selecting the interference coordination strategy by different cells, avoids signal interference among cells, improves signal strength among centralized cells, and solves the technical problem of signal difference among centralized cells.

In addition, an embodiment of this disclosure further provides a computer-readable storage medium.

The computer-readable storage medium of this disclosure stores an inter-cell interference coordination program thereon, wherein the inter-cell interference coordination program, when executed by a processor, implements the steps of the above-mentioned inter-cell interference coordination method.

The method implemented by the inter-cell interference coordination program can refer to various embodiments of the inter-cell interference coordination method in this disclosure, and will not be repeated here.

It should be noted that, as used herein, the terms "include", "comprise" or any other variations thereof are intended to cover a non-exclusive inclusion, such that a process, method, article, or system that comprises a series of elements not only comprises those elements, but also comprises other elements that are not explicitly listed, or further comprises elements that are inherent to the process, method, article, or system. Without further limitations, an element limited by "comprising a . . . " does not exclude the presence of other identical elements in the process, method, article, or system that comprises the element.

The numbers of embodiments in this disclosure are for description only and do not represent the advantages or disadvantages of the embodiments.

This disclosure can be used in numerous general or special computer system environments or configurations. For example: a personal computer, a server computer, a handheld or portable device, a tablet device, a multiprocessor system, a microprocessor-based system, a set-top box, a programmable consumer electronics device, a network PC, a minicomputer, a mainframe computer, and a distributed computing environment comprising any of the above systems or devices, etc. This disclosure can be described in the general context of computer-executable instructions that can be executed by a computer, such as program modules. In general, program modules comprise routines, programs, objects, components, data structures and the like that perform specific tasks or implement specific abstract data types. This disclosure can also be practiced in a distributed computing environment where tasks can be performed by remote processing devices that are connected by a communication network. In a distributed computing environment, program modules can be located in both local and remote computer storage media that comprises storage devices therein.

With the description of the above implementations, those skilled in the art can clearly understand that the above implementation methods can be effected via software and necessary general hardware platforms, as well as hardware, in many cases, the former is the preferred implementation. Based on such understanding, the technical solution of this disclosure essentially or the part contributing to the related art may be embodied in the form of a software product, the computer software product is stored in a storage medium (such as a ROM/RAM, a magnetic disk, and an optical disk), and comprises a number of instructions for instructing a terminal device (which may be a mobile phone, a computer, a server, an air conditioner, or a network device) to execute the methods described in various embodiments of this disclosure.

The above are merely interference coordination embodiments of this disclosure, and are not intended to limit the scope of this disclosure, any equivalent structures or equivalent process changes that are made using the content of this disclosure and the accompanying drawings, or techniques that are directly or indirectly applied in other related technical fields, are equally included in the scope of patent protection of this disclosure.

What is claimed is:

1. An inter-cell interference coordination method, comprising:

predicting a target service load of a target cell in the next period according to a historical service load of the target cell in a preset period, and determining a prediction strategy of targets for the target cell in the next period based on the target service load;

when there is a high-coherence neighboring cell, obtaining a prediction strategy of neighboring cells for the high-coherence neighboring cell in the next period, and determining a cluster state of the target cell based on the prediction strategy of targets and the prediction strategy of neighboring cells, wherein the high-coherence neighboring cell is a cell that is adjacent to the target cell and has an overlapping area with the target cell; and obtaining a prediction strategy of clusters for the cluster where the target cell is located in the next period, and determining that the strategy to be performed by the target cell in the next period is the prediction strategy of targets or the prediction strategy of clusters based on the cluster state.

2. The inter-cell interference coordination method of claim 1, wherein prior to obtaining a prediction strategy of clusters for the cluster where the target cell is located in the next period, the method further comprises:

predicting a target service load of each cell in the next period according to a service load of each cell in the cluster where the target cell is located, and obtaining a predicted load corresponding to each cell;

obtaining a prediction strategy of neighboring cells corresponding to each cell based on the predicted load, wherein the prediction strategy of neighboring cells is a first strategy or a second strategy; and obtaining a first number of cells corresponding to the first strategy and a second number of cells corresponding to the second strategy in the cluster where the target cell is located, and determining the prediction strategy of clusters based on the first number of cells and the second number of cells.

3. The inter-cell interference coordination method of claim 1, wherein obtaining a first number of cells corresponding to the first strategy and a second number of cells corresponding to the second strategy in the cluster where the target cell is located, and determining the prediction strategy of clusters based on the first number of cells and the second number of cells comprises:

obtaining a total number of cells in the cluster where the target cell is located, and calculating a first ratio and a second ratio, wherein the first ratio is the ratio of the first number of cells to the total number of cells, and the second ratio is the ratio of the second number of cells to the total number of cells; and determining the prediction strategy of clusters based on a first threshold, the first ratio and the second ratio.

4. The inter-cell interference coordination method of claim 1, wherein when there is a high-coherence neighboring cell, obtaining a prediction strategy of neighboring cells for the high-coherence neighboring cell in the next period, and determining a cluster state of the target cell based on the prediction strategy of targets and the prediction strategy of neighboring cells comprises:

calculating a third ratio of the number of cells corresponding to a "potential intra-cluster" state to the total number of all cells in a small cluster, and comparing the third ratio with a second threshold, wherein the small cluster comprises the target cell and the high-coherence neighboring cell;

determining whether the target cell belongs to the "potential intra-cluster" state based on the prediction strategy of targets and the prediction strategy of all neighboring cells; and determining the cluster state based on the state determination result of the target cell and the comparison result of the third ratio.

5. The inter-cell interference coordination method of claim 4, wherein determining the cluster state based on the state determination result of the target cell and the comparison result of the third ratio comprises:

where the target cell belongs to the "potential intra-cluster" state and the third ratio is greater than the second threshold, then determining that the cluster state is an "intra-cluster" state; and where the target cell belongs to the "potential intra-cluster" state and the third ratio is not greater than the second threshold, then determining that the cluster state is an "outside-of-cluster" state.

6. The inter-cell interference coordination method of claim 4, wherein determining the cluster state based on the state determination result of the target cell and the comparison result of the third ratio comprises:

where the target cell does not belong to the "potential intra-cluster" state and the third ratio is greater than the second threshold, then determining that the cluster state is a "cluster-edge" state; and where the target cell does not belong to the "potential intra-cluster" state and the third ratio is not greater than the second threshold, then determining that the cluster state is the "outside-of-cluster" state.

7. The inter-cell interference coordination method of claim 1, wherein determining that the strategy to be performed by the target cell in the next period is the prediction strategy of targets or the prediction strategy of clusters based on the cluster state comprises:

where the cluster state is the "cluster-edge" state or the "intra-cluster" state, then determining that the strategy to be performed in the next period is the prediction strategy of targets; and where the cluster state is the "outside-of-cluster" state, then determining that the strategy be performed in the next period is the cluster interference coordination strategy.

8. The inter-cell interference coordination method of claim 1, wherein prior to predicting a target service load of a target cell in the next period according to a historical service load of the target cell in a preset period, and determining a prediction strategy of targets for the target cell in the next period based on the target service load, the method further comprises:

dividing the target cell, the high-coherence neighboring cell, and cells having an overlapping area with the high-coherence neighboring cell into a new cluster, and making the new cluster as the cluster where the target cell is located.

9. An inter-cell interference coordination device, comprising a processor, a memory, and an inter-cell interference coordination program that is stored in the memory and is executable by the processor, wherein the inter-cell interference coordination program, when executed by the processor, implements an inter-cell interference coordination method, comprising:

predicting a target service load of a target cell in the next period according to a historical service load of the target cell in a preset period, and determining a prediction strategy of targets for the target cell in the next period based on the target service load;

when there is a high-coherence neighboring cell, obtaining a prediction strategy of neighboring cells for the high-coherence neighboring cell in the next period, and determining a cluster state of the target cell based on the prediction strategy of targets and the prediction strategy of neighboring cells, wherein the high-coherence neighboring cell is a cell that is adjacent to the target cell and has an overlapping area with the target cell; and obtaining a prediction strategy of clusters for the cluster where the target cell is located in the next period, and determining that the strategy to be performed by the target cell in the next period is the prediction strategy of targets or the prediction strategy of clusters based on the cluster state.

10. A non-volatile computer-readable storage medium, the computer-readable storage medium stores an inter-cell interference coordination program thereon, wherein the inter-cell interference coordination program, when executed by a processor, implements an inter-cell interference coordination method, comprising:

predicting a target service load of a target cell in the next period according to a historical service load of the target cell in a preset period, and determining a prediction strategy of targets for the target cell in the next period based on the target service load;

when there is a high-coherence neighboring cell, obtaining a prediction strategy of neighboring cells for the high-coherence neighboring cell in the next period, and determining a cluster state of the target cell based on the prediction strategy of targets and the prediction strategy of neighboring cells, wherein the high-coherence neighboring cell is a cell that is adjacent to the target cell and has an overlapping area with the target cell; and obtaining a prediction strategy of clusters for the cluster where the target cell is located in the next period, and determining that the strategy to be performed by the target cell in the next period is the prediction strategy of targets or the prediction strategy of clusters based on the cluster state.

11. The inter-cell interference coordination method of claim 2, wherein prior to predicting a target service load of a target cell in the next period according to a historical service load of the target cell in a preset period, and determining a prediction strategy of targets for the target cell in the next period based on the target service load, the method further comprises:

dividing the target cell, the high-coherence neighboring cell, and cells having an overlapping area with the high-coherence neighboring cell into a new cluster, and making the new cluster as the cluster where the target cell is located.

12. The inter-cell interference coordination method of claim 3, wherein prior to predicting a target service load of a target cell in the next period according to a historical service load of the target cell in a preset period, and determining a prediction strategy of targets for the target cell in the next period based on the target service load, the method further comprises:

dividing the target cell, the high-coherence neighboring cell, and cells having an overlapping area with the high-coherence neighboring cell into a new cluster, and making the new cluster as the cluster where the target cell is located.

13. The inter-cell interference coordination method of claim 4, wherein prior to predicting a target service load of a target cell in the next period according to a historical service load of the target cell in a preset period, and determining a prediction strategy of targets for the target cell in the next period based on the target service load, the method further comprises:

dividing the target cell, the high-coherence neighboring cell, and cells having an overlapping area with the high-coherence neighboring cell into a new cluster, and making the new cluster as the cluster where the target cell is located.

14. The inter-cell interference coordination method of claim 5, wherein prior to predicting a target service load of a target cell in the next period according to a historical service load of the target cell in a preset period, and determining a prediction strategy of targets for the target cell in the next period based on the target service load, the method further comprises:

dividing the target cell, the high-coherence neighboring cell, and cells having an overlapping area with the high-coherence neighboring cell into a new cluster, and making the new cluster as the cluster where the target cell is located.

15. The inter-cell interference coordination method of claim 6, wherein prior to predicting a target service load of a target cell in the next period according to a historical service load of the target cell in a preset period, and determining a prediction strategy of targets for the target cell in the next period based on the target service load, the method further comprises:

dividing the target cell, the high-coherence neighboring cell, and cells having an overlapping area with the high-coherence neighboring cell into a new cluster, and making the new cluster as the cluster where the target cell is located.

16. The inter-cell interference coordination method of claim 7, wherein prior to predicting a target service load of a target cell in the next period according to a historical service load of the target cell in a preset period, and determining a prediction strategy of targets for the target cell in the next period based on the target service load, the method further comprises:

dividing the target cell, the high-coherence neighboring cell, and cells having an overlapping area with the high-coherence neighboring cell into a new cluster, and making the new cluster as the cluster where the target cell is located.

17. The inter-cell interference coordination device of claim 9, wherein prior to obtaining a prediction strategy of clusters for the cluster where the target cell is located in the next period, the method further comprises:

predicting a target service load of each cell in the next period according to a service load of each cell in the cluster where the target cell is located, and obtaining a predicted load corresponding to each cell;

obtaining a prediction strategy of neighboring cells corresponding to each cell based on the predicted load, wherein the prediction strategy of neighboring cells is a first strategy or a second strategy; and obtaining a first number of cells corresponding to the first strategy and a second number of cells corresponding to the second strategy in the cluster where the target cell is located, and determining the prediction strategy of clusters based on the first number of cells and the second number of cells.

18. The inter-cell interference coordination device of claim 9, wherein obtaining a first number of cells corresponding to the first strategy and a second number of cells corresponding to the second strategy in the cluster where the target cell is located, and determining the prediction strategy of clusters based on the first number of cells and the second number of cells comprises:

obtaining a total number of cells in the cluster where the target cell is located, and calculating a first ratio and a second ratio, wherein the first ratio is the ratio of the first number of cells to the total number of cells, and the second ratio is the ratio of the second number of cells to the total number of cells; and determining the prediction strategy of clusters based on a first threshold, the first ratio and the second ratio.

19. The non-volatile computer-readable storage medium of claim 10, wherein prior to obtaining a prediction strategy of clusters for the cluster where the target cell is located in the next period, the method further comprises:

predicting a target service load of each cell in the next period according to a service load of each cell in the cluster where the target cell is located, and obtaining a predicted load corresponding to each cell;

obtaining a prediction strategy of neighboring cells corresponding to each cell based on the predicted load, wherein the prediction strategy of neighboring cells is a first strategy or a second strategy; and obtaining a first number of cells corresponding to the first strategy and a second number of cells corresponding to the second strategy in the cluster where the target cell is located, and determining the prediction strategy of clusters based on the first number of cells and the second number of cells.

20. The non-volatile computer-readable storage medium of claim 18, wherein obtaining a first number of cells corresponding to the first strategy and a second number of cells corresponding to the second strategy in the cluster where the target cell is located, and determining the prediction strategy of clusters based on the first number of cells and the second number of cells comprises:

obtaining a total number of cells in the cluster where the target cell is located, and calculating a first ratio and a second ratio, wherein the first ratio is the ratio of the first number of cells to the total number of cells, and the second ratio is the ratio of the second number of cells to the total number of cells; and determining the prediction strategy of clusters based on a first threshold, the first ratio and the second ratio.

* * * * *